United States Patent
Nelson et al.

(10) Patent No.: US 10,442,935 B2
(45) Date of Patent: Oct. 15, 2019

(54) COATINGS COMBINING OIL-ABSORBING AND OIL-REPELLING COMPONENTS FOR INCREASED SMUDGE RESISTANCE

(71) Applicant: HRL Laboratories, LLC, Malibu, CA (US)

(72) Inventors: Ashley M. Nelson, Los Angeles, CA (US); Andrew P. Nowak, Los Angeles, CA (US); April R. Rodriguez, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 171 days.

(21) Appl. No.: 15/667,463

(22) Filed: Aug. 2, 2017

(65) Prior Publication Data

US 2018/0037746 A1 Feb. 8, 2018

Related U.S. Application Data

(60) Provisional application No. 62/371,724, filed on Aug. 6, 2016.

(51) Int. Cl.

| | |
|---|---|
| *C09D 5/16* | (2006.01) |
| *C09D 5/00* | (2006.01) |
| *C09D 175/08* | (2006.01) |
| *C08G 18/32* | (2006.01) |
| *C08G 18/50* | (2006.01) |
| *C08G 18/62* | (2006.01) |
| *C08G 18/66* | (2006.01) |
| *C08G 18/75* | (2006.01) |
| *C08G 18/61* | (2006.01) |
| *C08G 18/24* | (2006.01) |
| *C09D 175/04* | (2006.01) |
| *C09D 183/08* | (2006.01) |
| *C08G 77/24* | (2006.01) |

(52) U.S. Cl.
CPC ............. *C09D 5/00* (2013.01); *C08G 18/246* (2013.01); *C08G 18/3206* (2013.01); *C08G 18/50* (2013.01); *C08G 18/5015* (2013.01); *C08G 18/61* (2013.01); *C08G 18/6208* (2013.01); *C08G 18/6677* (2013.01); *C08G 18/758* (2013.01); *C09D 175/04* (2013.01); *C09D 175/08* (2013.01); *C09D 183/08* (2013.01); *C08G 77/24* (2013.01); *C09D 5/1662* (2013.01)

(58) Field of Classification Search
CPC .................................................. C09D 5/1662
See application file for complete search history.

(56) References Cited

U.S. PATENT DOCUMENTS

| | | |
|---|---|---|
| 3,435,003 A | 3/1969 | Craven |
| 3,810,874 A | 5/1974 | Mitsch et al. |
| 3,847,978 A | 11/1974 | Sianesi et al. |
| 4,777,224 A | 10/1988 | Gorzynski et al. |
| 4,956,438 A | 9/1990 | Ruetman et al. |
| 5,032,666 A | 7/1991 | Hu et al. |
| 5,084,315 A | 1/1992 | Karimi et al. |
| 5,189,135 A | 2/1993 | Cozzi et al. |
| 5,290,418 A | 3/1994 | Menchen et al. |
| 5,332,798 A * | 7/1994 | Ferreri ............... C08G 18/10 528/61 |
| 5,589,552 A | 12/1996 | Simeone et al. |
| 5,798,415 A | 8/1998 | Corpart et al. |
| 6,071,564 A | 6/2000 | Marchetti et al. |
| 6,579,835 B2 | 6/2003 | Scicchitano et al. |
| 6,926,937 B2 | 8/2005 | Extrand et al. |
| 6,992,132 B2 | 1/2006 | Trombetta et al. |
| 7,655,310 B2 | 2/2010 | Trombetta |
| 9,136,562 B2 | 9/2015 | Singh et al. |
| 2002/0016267 A1 | 2/2002 | Scicchitano et al. |
| 2003/0006848 A1 | 4/2003 | Arney et al. |

(Continued)

FOREIGN PATENT DOCUMENTS

| | | |
|---|---|---|
| EP | 1558661 B1 | 12/2012 |
| WO | 1997035919 A1 | 10/1997 |

(Continued)

OTHER PUBLICATIONS

Rabnawaz, M.; Liu, G. Angew. Chem. Int. Ed. 2015, 54, 6516.*
Ashish Vaidya and Manoj K. Chaudhury, "Synthesis and Surface Properties of Environmentally Responsive Segmented Polyurethanes," Journal of Colloid and Interface Science 249, 235-245 (2002).
Siochi et al., "Engineered Surfaces for Mitigation of Insect Residue Adhesion" NF1676L-15481 SAMPE 2013; May 6-9, 2013; Long Beach, CA; United States.
Wohl et al., "Evaluation of commercially available materials to mitigate insect residue adhesion on wing leading edge surfaces," Progress in Organic Coatings 76 (2013) 42-50.
Kok et al., "Influence of surface characteristics on insect residue adhesion to aircraft leading edge surfaces," Progress in Organic Coatings 76 (2013) 1567-1575.

(Continued)

*Primary Examiner* — Michael F Pepitone
(74) *Attorney, Agent, or Firm* — O'Connor & Company

(57) ABSTRACT

This disclosure provides coatings that eliminate the problem of persistent oil or grease smudges deposited on transparent coatings. Some variations provide an oil-smudge-resistant material comprising discrete inclusions dispersed within a continuous matrix, wherein one of the discrete inclusions and the continuous matrix is an oleophobic material, and the other is an oleophilic material. Specific embodiments incorporate segmented polyurethanes with oleophobic fluoropolymers and oleophilic hydrocarbons. Some embodiments utilize inorganic oleophilic particles in an oleophobic matrix. Some embodiments condense urethane-silane crosslinkers with other silanes to form discrete domains of oleophobic or oleophilic silanes within a continuous matrix of oleophilic or oleophobic polymer. Waterborne coatings are provided in which one of the discrete inclusions and the continuous matrix is derived from an aqueous dispersion of a linear crosslinkable polyurethane containing charged groups, and the other is derived from a crosslinking agent containing charged groups.

23 Claims, 4 Drawing Sheets

(56) References Cited

U.S. PATENT DOCUMENTS

| | | |
|---|---|---|
| 2003/0229176 A1 | 12/2003 | Trombetta et al. |
| 2004/0019143 A1 | 1/2004 | Koloski et al. |
| 2005/0164010 A1 | 7/2005 | Trombetta |
| 2006/0189750 A1 | 8/2006 | Maier et al. |
| 2007/0141264 A1 | 6/2007 | Satgurunathan et al. |
| 2007/0298216 A1 | 12/2007 | Jing et al. |
| 2008/0015298 A1* | 1/2008 | Xiong ................. C08K 3/22 524/432 |
| 2008/0219944 A1 | 9/2008 | Longo et al. |
| 2010/0324205 A1 | 12/2010 | Maier et al. |
| 2011/0177987 A1 | 7/2011 | Lenting et al. |
| 2011/0218290 A1 | 9/2011 | Webster et al. |
| 2011/0229750 A1 | 9/2011 | McLellan et al. |
| 2011/0213085 A1 | 11/2011 | Tonelli et al. |
| 2012/0136120 A1 | 2/2012 | Bosman |
| 2012/0164565 A1 | 6/2012 | Qiu |
| 2014/0113144 A1 | 4/2014 | Loth et al. |
| 2014/0127516 A1 | 5/2014 | Wang et al. |
| 2014/0162022 A1 | 6/2014 | Nowak et al. |
| 2015/0158969 A1* | 6/2015 | Nowak ............. C08G 18/5072 528/70 |
| 2015/0329453 A1 | 11/2015 | Guarda et al. |
| 2016/0028114 A1 | 1/2016 | Pratt et al. |
| 2016/0201005 A1 | 7/2016 | Nowak et al. |

FOREIGN PATENT DOCUMENTS

| | | |
|---|---|---|
| WO | 2013158360 A1 | 10/2013 |
| WO | 2014131695 A1 | 9/2014 |
| WO | 2016044880 A1 | 3/2016 |

OTHER PUBLICATIONS

Lee et al., "Zwitter-Wettability and Antifogging Coatings with Frost-Resisting Capabilities," ACS Nano 7 (2013) 2172-2185.

Chen et al., "Robust Prototypical Anti-icing Coatings with a Self-lubricating Liquid Water Layer between Ice and Substrate," ACS Appl. Mater. Interfaces 5 (2013) 4026-4030.

Turri et al., "Waterborne Anionomeric Polyurethane-Ureas from Functionalized Fluoropolyethers," Journal of Applied Polymer Science, vol. 93, 136-144 (2004).

Dou et al., "Anti-icing Coating with an Aqueous Lubricating Layer," ACS Appl. Mater. Interfaces 2014, 6, 6998-7003.

Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.

Chen et al., "A Thermally Re-mendable Cross-Linked Polymeric Material," Science 295 (5560), 1698-1702, Mar. 1, 2002.

Oster et al., "Photoreduction of Metal Ions by Visible Light," Departmenotf Chemistry, Polytechnic Institute of Brooklyn, 135th National meeting of the American Chemical Society, Nov. 5, 1959.

Wojtecki et al., "Using the dynamic bond to access macroscopically responsive structurally dynamic polymers," Nature Materials vol. 10, Jan. 2011.

Rabnawaz et al., "Graft-Copolymer-Based Approach to Clear, Durable, and Anti- Smudge Polyurethane Coatings" Angew. Chem. Int. Ed. 2015, 54, 6516-6520.

Unkelhäußer et al., "The best of two worlds. Silane-urethane hybrid crosslinkers create scratch-resistant clearcoats" European Coatings Journal 2014, 21.

Brown et al., "Mechanically durable, superoleophibic coatings prepared by layer-by-layer technique for anti-smudge and oil-water separation" Scientific Reports 2015, 5, 8701.

* cited by examiner

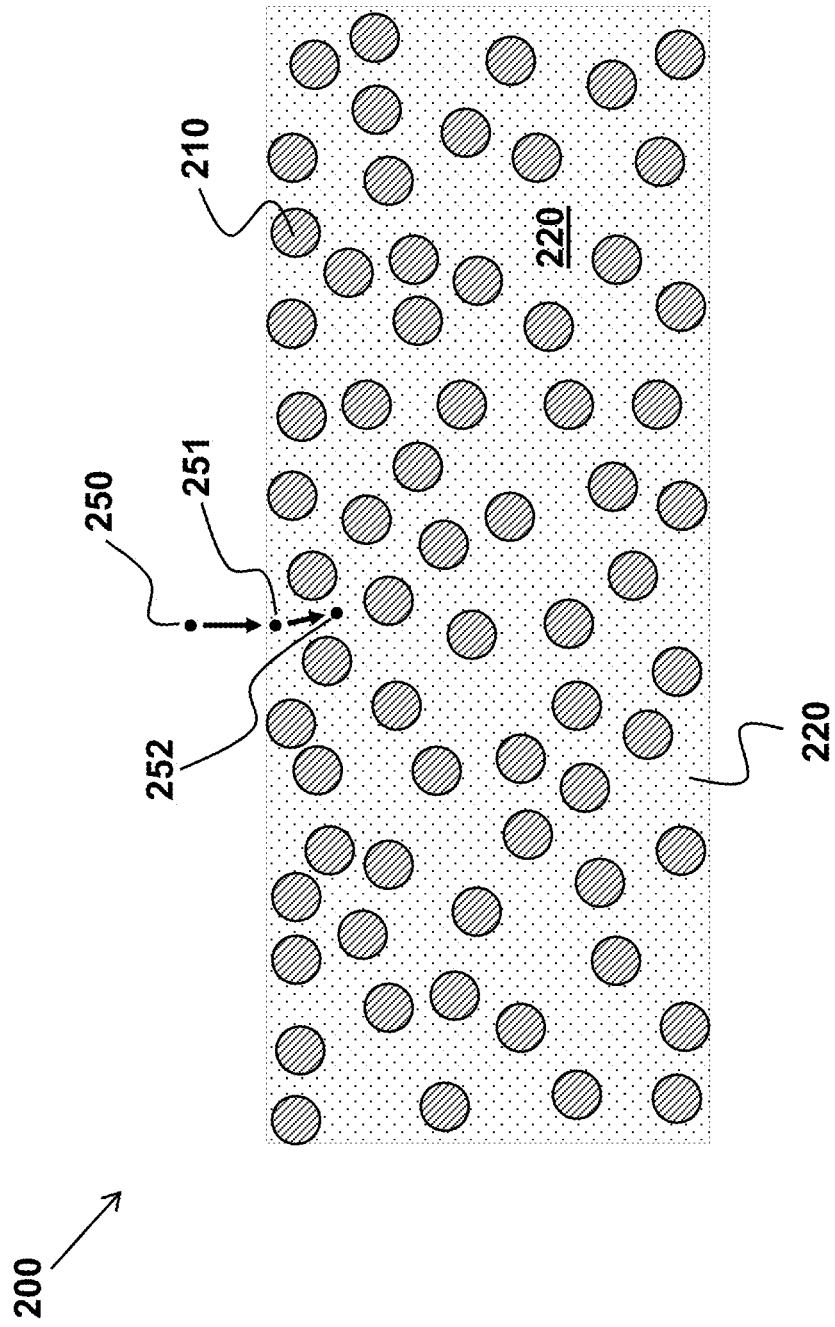

COATINGS COMBINING OIL-ABSORBING AND OIL-REPELLING COMPONENTS FOR INCREASED SMUDGE RESISTANCE

PRIORITY DATA

This patent application also claims priority to U.S. Provisional Patent App. No. 62/371,724, filed on Aug. 6, 2016, which is hereby incorporated by reference herein.

FIELD OF THE INVENTION

The present invention generally relates to anti-smudge materials and coatings, and systems containing these materials and coatings.

BACKGROUND OF THE INVENTION

Anti-smudge coatings are of interest for touchscreens to provide a better consumer experience by increasing perception of cleanliness. Touchscreens have become pervasive in society, including phone screens, computer screens, vehicle controls, appliances, and so on. Oil smudges can be problematic for many types of surfaces (e.g., refrigerators), not only transparent surfaces.

Anti-fouling coatings designed to keep surfaces clear of water, oil, mud, and so on are generally desirable to maintain both performance and aesthetics. Many coatings in the anti-fouling category operate on a principle of wetting and dewetting. Such coatings are made of a single component to create water or oil with a high contact angle, causing the oil to bead up and roll off of a surface in order to clear it of unwanted debris. Such coatings perform poorly against oil and grease deposited in a thin layer, typically by means of mechanical rubbing of an oil-containing substrate onto the coating (versus an oil spill for example). After simple rubbing, there is not enough oily material to effectively bead up and roll off the surface.

There are a considerable number of examples of anti-smudge coatings in existence today. Many of these technologies are based on a fluorinated surface that acts to create an oleophobic coating based on a pure dewetting mechanism. Challenges in this area include the need to reduce inclusions to typically less than 50 nanometers in order to minimize light scattering and maintain good visual transparency. Limited commercial success of a genuine oil-absorbing anti-smudge technology is complicated by the need for durability, scalability, and permanence of the anti-smudge properties throughout the lifetime of the coating. The combination of these properties is lacking in current off-the-shelf technology reported in the academic literature.

Current anti-smudge coatings focus on incorporating oil-repelling species, sometimes coupled with deliberate surface roughness.

In Rabnawaz et al., "Graft-Copolymer-Based Approach to Clear, Durable, and Anti-Smudge Polyurethane Coatings", *Angew. Chem.* 2015, 127, 6616-6620, small discrete fluoro domains in a sea of highly crosslinked polyurethane are employed in order to produce a transparent anti-smudge coating. The approach employed is to functionalize a polyurethane polyol precursor with monofunctional PFPE (Krytox™ oils). When blended with unfunctionalized polyol and crosslinker, small domains of fluoro-containing elements are created.

In Rabnawaz et al., "Fluorine-Free Anti-Smudge Polyurethane Coatings", *Angew. Chem.* 2015, 127, 12913-12918, transparent anti-smudge polyurethane coatings are created without the use of fluoro components. To achieve this, polydimethylsiloxane (PDMS) was used as the hydrophobic domain and was grafted onto the polymer backbone to eliminate macrophase separation which would cause haze. The approach employed is to functionalize a polyurethane polyol precursor with monofunctional PDMS to avoid expensive fluoro-containing reagents. When blended with unfunctionalized polyol and crosslinker, small domains of PDMS elements are created.

Rabnawaz et al. describe structured polymer coatings containing oleophobic regions through the use of fluorinated domains. Their work provided transparent coatings which successfully passed anti-smudge benchmark tests such as contact angle measurements with oil and water. These coatings solely rely on the oil repellency of fluorinated or polydimethylsiloxane (PDMS) species and find success at the macroscale. These coatings perform based on a dewetting mechanism, which will not be able to remove small amounts of remaining oil, as discussed above. Furthermore, Rabnawaz et al. use a graft copolymer approach to achieve microphase-separated structured domains which is not easily scalable to commercially relevant quantities.

In Hikita et al., "Super-Liquid-Repellent Surfaces Prepared by Colloidal Silica Nanoparticles Covered with Fluoroalkyl Groups", *Langmuir* 2005, 21, 7299, liquid repellent coatings are made through optimizing surface roughness and chemistry. The coatings were prepared via sol-gel polycondensation using colloidal silica and fluorosilanes added to increase oil repellency. The approach demonstrates the effect of surface roughness on wetting properties, showing increased water and oil contact angles at an optimum surface roughness. The manuscript claims scalable, durable, transparent films—however, the coating is spin-coated onto the substrate resulting in a very thin (~500 nm) film. This application technique would be difficult to scale commercially to a variety of substrates. Additionally, this technology relies solely on the structure of the surface for optimal performance. Wear of the coating over time would negate the positive surface roughness effects.

In Tuteja et al., "Designing Superoleophobic Surfaces", *Science* 2007, 318, 1618, superoleophobic surfaces are created through optimizing surface structure and chemistry. A combination of deposition and electrospinning created surfaces with advancing and receding contact angles>130° for octane. The approach demonstrates the effect of surface chemistry and structure on dewetting properties, specifically focused on superoleophobicity. Tuteja et al. show the Cassie and Wenzel hypotheses in action, successfully creating oleophobic silicon surfaces. The surface techniques would be difficult to scale commercially to a variety of substrates and this technology relies solely on the structure of the surface for optimal performance. Wear of the coating over time would negate the positive surface roughness effects.

Surface and/or coating roughness is another variable exploited to increase oleophobicity. Literature, as described by the work of Tuteja et al. and Hikita et al. above, shows that rough surfaces commonly shed liquid contaminants (oil) better than smooth surfaces. A pitfall of this strategy is that the improved hydrophobicity and oleophobicity is strictly dependent on the surface structure and often requires deposition techniques not easily scalable to large quantities or a variety of substrates. As the coating is used and wears or erodes over time, the effect is diminished.

Oleophilic wipes are on the market, designed to remove smudges from various surfaces such as touchscreens. However, these wipes are not a passive solution that is built into the coating itself.

What is needed is an oil-smudge-resistant material and coating that is durable, scalable, and permanent. The coatings need to remain effective over the lifetime of the coating. Optically transparent, oil-smudge-resistant coatings are important for a number of applications.

SUMMARY OF THE INVENTION

The present invention addresses the aforementioned unmet needs in the art, as will now be summarized and then further described in detail below.

Some variations of the invention provide an oil-smudge-resistant material comprising a plurality of discrete inclusions dispersed within a continuous matrix, wherein one of the discrete inclusions and the continuous matrix is an oleophobic material, and the other of the discrete inclusions and the continuous matrix is an oleophilic material.

In some embodiments, an oil-smudge-resistant material comprises a plurality of discrete oleophilic inclusions dispersed within an oleophobic continuous matrix. In other embodiments, an oil-smudge-resistant material comprises a plurality of discrete oleophobic inclusions dispersed within an oleophilic continuous matrix.

In certain embodiments of the invention, the oil-smudge-resistant material is transparent.

In some embodiments, the inclusions and the continuous matrix are phase-separated regions of a copolymer, such as a segmented copolymer. In these embodiments, the inclusions and the continuous matrix may be phase-separated regions of a segmented copolymer that includes:

(a) one or more first soft segments selected from fluoropolymers having an average molecular weight from about 500 g/mol to about 20,000 g/mol, wherein the fluoropolymers are $(\alpha,\omega)$-hydroxyl-terminated and/or $(\alpha,\omega)$-amine-terminated;

(b) one or more second soft segments selected from saturated or unsaturated polymeric hydrocarbons that are $(\alpha,\omega)$-hydroxyl-terminated and/or $(\alpha,\omega)$-amine-terminated;

(c) one or more isocyanate species, or a reacted form thereof, possessing an isocyanate functionality of 2 or greater; and (d) one or more polyol or polyamine chain extenders or crosslinkers, or a reacted form thereof.

The discrete inclusions may be present in a concentration from about 1 wt % to about 99 wt % based on total weight of the oil-smudge-resistant material. The continuous matrix may be present in a concentration from about 1 wt % to about 99 wt % based on total weight of the oil-smudge-resistant material.

In some embodiments, the discrete inclusions have an average size (e.g., effective diameter) from about 1 nm to about 10 µm, such as from about 1 nm to about 100 nm. In these or other embodiments, the discrete inclusions have an average center-to-center spacing between adjacent inclusions, through the continuous matrix, from about 5 nm to about 10 µm, such as from about 5 nm to about 100 nm.

The oleophilic material may be a polymer, such as a polyolefin, which may be selected from the group consisting of polyethylene, polypropylene, polybutene, polybutadiene, hydrogenated polybutadiene, polymethylpentene, polyisobutylene, polyisoprene, and combinations thereof.

The oleophilic material may be an inorganic material that is surface-modified to contain a hydrocarbon surface species, such as a hydrocarbon surface species selected from the group consisting of saturated or unsaturated $C_6$-$C_{20}$ hydrocarbon groups.

The oleophilic material may be an inorganic material derived from a hydrolysable silane, such as octyltrimethoxysilane, octyltriethoxysilane, decyltrimethoxysilane, decyltriethoxysilane, octadecyltrimethoxysilane, octadecyltriethoxysilane, or combinations or homologues thereof.

In some embodiments, the oleophobic material has a surface energy from about 5 mJ/m$^2$ to about 50 mJ/m$^2$.

The oleophobic material may be selected from the group consisting of perfluoropolyethers, polytetrafluoroethylene, polyvinylidene fluoride, polyvinyl fluoride, perfluoroethers, fluoroacrylates, fluorosilicones, siloxanes, and combinations thereof. In certain embodiments, the oleophobic material is not polytetrafluoroethylene.

The oil-smudge-resistant material may be waterborne, solventborne, or a combination thereof. In waterborne embodiments, one of the discrete inclusions and the continuous matrix may be derived from an aqueous dispersion of a linear crosslinkable polyurethane containing charged groups, and the other of the discrete inclusions and the continuous matrix may be derived from a crosslinking agent containing charged groups.

In certain embodiments, the continuous matrix is hygroscopic or further includes a hygroscopic material. In these or other embodiments, the discrete inclusions are hygroscopic or further include a hygroscopic material.

The oil-smudge-resistant material, during use, will typically contain captured oil in the oleophilic material (whether in the discrete inclusions or the continuous matrix). Captured oil means that oil is physically absorbed in or adsorbed on the oleophilic material, typically not reacted chemically with the oleophilic material.

In some variations of the invention, the oil-smudge-resistant material forms a coating disposed on a substrate. The coating may have a thickness from about 1 µm to about 10 mm, for example. Many substrates are possible.

BRIEF DESCRIPTION OF THE DRAWINGS

FIG. 2A depicts an exemplary oil-smudge-resistant material with an oleophilic matrix and a plurality of oleophobic inclusions dispersed throughout the oleophilic matrix, in some embodiments of the invention.

DETAILED DESCRIPTION OF EMBODIMENTS OF THE INVENTION

Figure 1A:
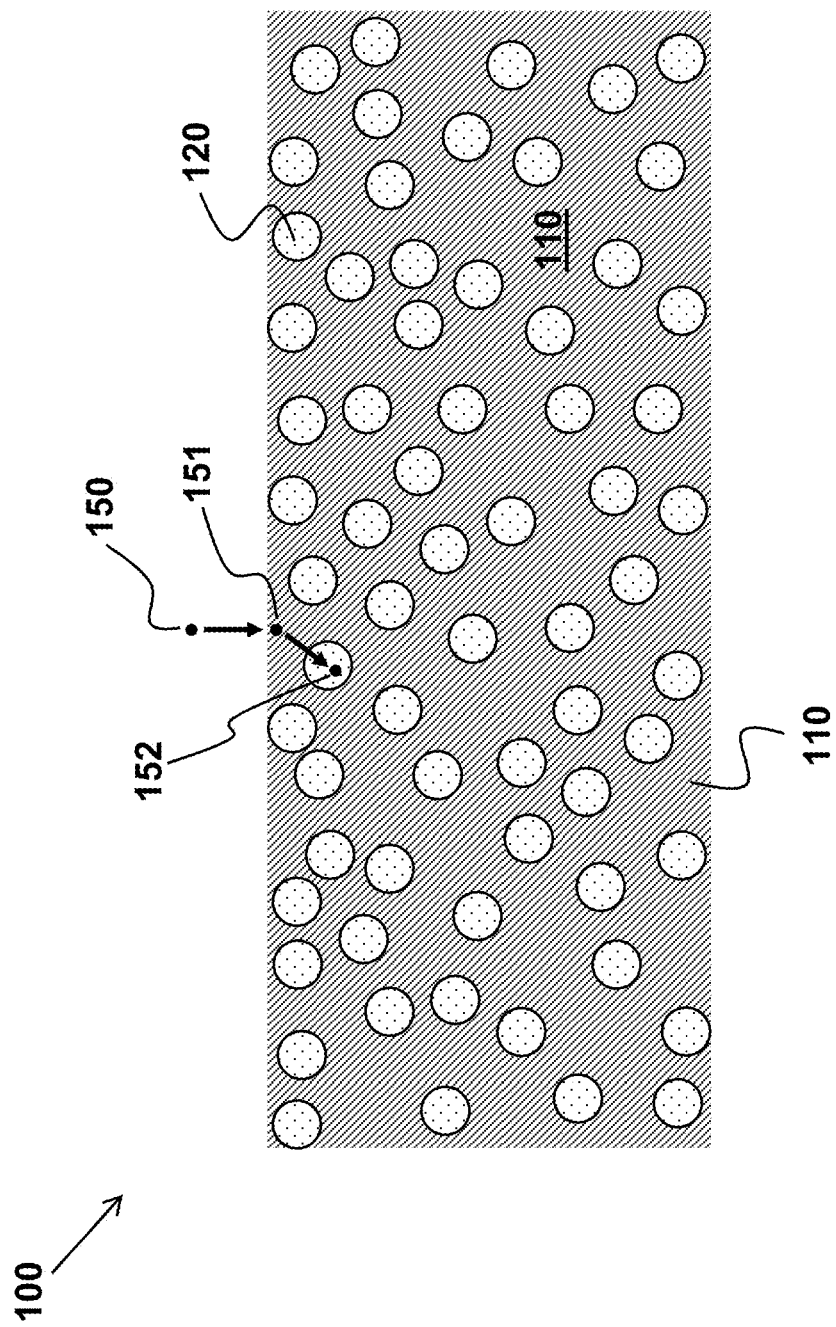
FIG. 1A depicts an exemplary oil-smudge-resistant material with an oleophobic matrix and a plurality of oleophilic inclusions dispersed throughout the oleophobic matrix, in some embodiments of the invention.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of the disclosure provide coatings designed to eliminate the problem of persistent oil or grease smudges (e.g. finger oil) deposited on coatings in a thin layer at the coating surface. These coatings are relevant, for example, in touchscreens for improved consumer aesthetics and perceptions of cleanliness.

Two separate components are combined structurally at the coating surface to create discrete domains or islands. These two distinct species are designed or selected such that one is oleophobic and the other is oleophilic. The oleophobic domain repels oil from its local region, and the oleophilic domain removes oil from the coating surface by transporting the oil into the interior of the coating.

Some variations include oleophilic regions within an oleophobic matrix. Some variations instead include oleophobic regions within an oleophilic matrix. Some variations provide oil-absorbing regions within a matrix of low-surface-energy dewetting material. Some variations instead provide low-surface-energy regions within a matrix of oil-absorbing material.

An advantage of variations of the present invention is that the coating is designed to effectively absorb oily contaminants into the body of the coating rather than clearing them from the coating surface by a wetting mechanism. In some embodiments, a combination of fluorinated low-surface-energy components creates oleophobic regions that assist in driving oil into oleophilic domains which are capable of capturing the oil. This mass-transport approach is well-suited to a thin layer of oil such as found in fingerprints at a surface. This design eliminates the diffuse scattering that arises from oily contamination on a transparent layer, which creates the clear visual cue associated with oil at a surface.

Variations of the invention include: (1) segmented polyurethane coatings combining a microphase-separated structure of fluorinated and hydrocarbon species (e.g., polybutadiene); (2) a fluorinated continuous phase with dispersed hydrocarbon-coated, oleophilic inorganic nanoparticles which specifically absorb oily residue; (3) fluorinated polyurethane oligomers terminated with silane groups and mixed with hydrocarbon-silane precursors to condense discrete oleophobic regions; and (4) waterborne polyurethane dispersions combining oleophobic and oleophilic species. A common element across all of these variations is the incorporation of oleophilic domains in an oleophobic matrix, or oleophobic domains in an oleophilic matrix. In some variations, the oleophobic and oleophilic regions phase-separate on the nanoscale.

There are several factors of the present invention which address current shortcomings (transparency, scalability, and effectiveness over the lifetime of the coating). First, the coatings include both oleophobic and oleophilic regions to effectively eliminate fingerprint smudge on both the macroscale and microscale/nanoscale through two symbiotic mechanisms. This will enable the coating to not only shed excess oil, but absorb, or transport, remaining oil throughout the coating left after wiping. Second, the coatings may maintain the transparency required for many commercial applications and a continued pleasing aesthetic. Third, the coatings contain active elements that are dispersed throughout the depth of the coating (not just at the surface), thereby enabling continued success over the lifetime (wear) of the coating. Fourth, the coatings provided herein have economic scalability for both the synthesis (e.g., self-organizing polymer domains) and application of the coating (e.g., spray coating).

As intended herein, "smudge resistance" means that a material or coating resists the formation of smudges created by oils, water, or combinations of oil and water. "Smudge" refers to a blemish, smear, or other visual defect on a coating or material surface. In some embodiments, a material or coating is "oil-smudge-resistant" which means that the material or coating resists the formation of oil smudges, such as those typically caused by human fingerprints.

An oleophilic material has a strong affinity for oils. As meant herein, the term "oleophilic" means a material with a contact angle of hexadecane (model oil compound) of 90° or less. A "superoleophilic" material for present purposes has a contact angle of 30° or less. An oleophilic material may also be classified as lipophilic.

An oleophobic material has a poor affinity for oils. As intended herein, the term "oleophobic" means a material with a contact angle of hexadecane greater than 90°. A "superoleophobic" material for present purposes has a contact angle of 150° or greater. An oleophobic material may also be classified as lipophobic.

Some variations of the invention provide an oil-smudge-resistant material comprising a plurality of discrete inclusions dispersed within a continuous matrix, wherein one of the discrete inclusions and the continuous matrix is an oleophobic material, and the other of the discrete inclusions and the continuous matrix is an oleophilic material.

In some embodiments, an oil-smudge-resistant material comprises a plurality of discrete oleophilic inclusions dispersed within an oleophobic continuous matrix. In other embodiments, an oil-smudge-resistant material comprises a plurality of discrete oleophobic inclusions dispersed within an oleophilic continuous matrix.

The discrete inclusions may be different phases (e.g. microphase-separated regions) of a common material such as a segmented copolymer. Alternatively, or additionally, the discrete inclusions may be another material entirely, such as nanoparticles. In some embodiments, there are both phase-separated inclusions of the same chemical material, as well as physically and chemically distinct materials as additional inclusions.

In some embodiments, the inclusions and the continuous matrix are phase-separated regions of a copolymer, such as a segmented copolymer. In these embodiments, the inclusions and the continuous matrix may be phase-separated regions of a segmented copolymer that includes:

(a) one or more first soft segments selected from fluoropolymers having an average molecular weight from about 500 g/mol to about 20,000 g/mol, wherein the fluoropolymers are ($\alpha,\omega$)-hydroxyl-terminated and/or ($\alpha,\omega$)-amine-terminated;

(b) one or more second soft segments selected from saturated or unsaturated polymeric hydrocarbons that are ($\alpha,\omega$)-hydroxyl-terminated and/or ($\alpha,\omega$)-amine-terminated;

(c) one or more isocyanate species, or a reacted form thereof, possessing an isocyanate functionality of 2 or greater; and (d) one or more polyol or polyamine chain extenders or crosslinkers, or a reacted form thereof.

The discrete inclusions may be present in a concentration from about 1 wt % to about 99 wt % based on total weight of the oil-smudge-resistant material. In various embodiments, the discrete inclusions may be present in a concentration of about 1, 5, 10, 20, 30, 40, 50, 60, 70, 80, 90, or 95 wt % based on total weight of the oil-smudge-resistant material.

The continuous matrix may be present in a concentration from about 1 wt % to about 99 wt % based on total weight of the oil-smudge-resistant material. In various embodiments, the continuous matrix may be present in a concentration of about 1, 5, 10, 20, 30, 40, 50, 60, 70, 80, 90, or 95 wt % based on total weight of the oil-smudge-resistant material. In addition to the continuous matrix and discrete inclusions, various additives may be present, and captured oil may be present. Additives may be selected from the group consisting of a particulate filler, a pigment, a dye, a plasticizer, a flame retardant, a flattening agent, and a substrate adhesion promoter.

In some embodiments, the discrete inclusions have an average size (e.g., effective diameter) from about 1 nm to about 150 μm, such as from about 5 nm to about 10 μm. In various embodiments, the discrete inclusions have an average size (e.g., effective diameter) of about 1 nm, 5 nm, 10 nm, 25 nm, 50 nm, 100 nm, 200 nm, 500 nm, 1 μm, 2 μm, 5 μm, 10 μm, 50 μm, 100 μm, or 150 μm.

In these or other embodiments, the discrete inclusions have an average center-to-center spacing between adjacent inclusions, through the continuous matrix, from about 5 nm to about 150 μm, such as from about 10 nm to about 10 μm. In various embodiments, the discrete inclusions have an average center-to-center spacing between adjacent inclusions of about 1 nm, 5 nm, 10 nm, 25 nm, 50 nm, 100 nm, 200 nm, 500 nm, 1 μm, 2 μm, 5 μm, 10 μm, 50 μm, 100 μm, or 150 μm.

In certain embodiments of the invention, the oil-smudge-resistant material is transparent. The length scale and microstructure of the domains are important for optical transparency, as structures above 50-100 nm will tend to scatter visible light and induce opacity. As a result, it is desirable for coatings intended to be transparent to limit the oleophilic oil reservoirs (inclusions or regions of matrix) to nanoscale dimensions, in some embodiments.

In some preferred embodiments, the average size (e.g., effective diameter) of the discrete inclusions is about 100 nm or less, preferably about 50 nm or less. These size ranges are beneficial when the discrete inclusions are not transparent or not refractive index-matched with the continuous matrix, but when transparent coatings are desired.

In some preferred embodiments, the average center-to-center spacing between adjacent inclusions is about 100 nm or less, preferably about 50 nm or less. These size ranges are beneficial when the continuous matrix is not itself transparent, but when transparent coatings are desired.

Scattering of light including visible wavelengths in the bulk of a material is governed by changes in the index of refraction through the medium. Variations in index at length scales near the wavelength of the propagating radiation will tend to scatter those wavelengths more effectively (Mie scattering) resulting in an opaque or white appearance for a coating. With visible light having wavelengths of about 400 nm to 700 nm, a clear or transparent coating preferably has variations in index of refraction below ~50 nm in length. See Althues et al., "Functional inorganic nanofillers for transparent polymers", *Chem. Soc. Rev.,* 2007, 36, 1454-1465, which is hereby incorporated by reference herein.

In some embodiments, the coating is not transparent. In this case, nanoscale phase separation is not necessary.

The oleophilic material may be organic or inorganic. In some embodiments, the oleophilic material is a polymer, such as a polyolefin, which may be selected from the group consisting of polyethylene, polypropylene, polybutene, polybutadiene, polymethylpentene, polyisobutylene, polyisoprene, and combinations thereof.

When the oleophilic material contains polybutadiene, the polybutadiene may have various connectivities of the polymer chain, including cis, trans, and vinyl polymerization. Also, the polybutadiene (or other olefins selected for the oleophilic material) may be partially or completely hydrogenated, in some embodiments.

In some embodiments, the oleophilic material is a carbonaceous material, such as graphene, graphene oxides, or carbon aerogels.

In some embodiments, the oleophilic material is an inorganic material that is surface-modified to contain a hydrocarbon surface species, such as a hydrocarbon surface species selected from the group consisting of saturated or unsaturated $C_6$-$C_{20}$ hydrocarbon groups (e.g., alkyl or aryl groups such as octyl, decyl, or octadecyl groups, or homologues thereof).

The oleophilic material may be an inorganic material derived from a hydrolysable silane, such as octyltrimethoxysilane, octyltriethoxysilane, decyltrimethyoxysilane, decyltriethyoxysilane, octadecyltrimethoxysilane, octadecyltriethoxysilane, or combinations or homologues thereof. In particular, the inorganic materials may be formed in situ from precursors added to the uncured resin formulation.

In some embodiments, the oleophobic material has a surface energy from about 5 mJ/m$^2$ to about 50 mJ/m$^2$. The oleophobic material may be selected from the group consisting of perfluoropolyethers, polytetrafluoroethylene, polyvinylidene fluoride, polyvinyl fluoride, perfluoroethers, fluoroacrylates, fluorosilicones, siloxanes, and combinations thereof.

The oil-smudge-resistant material may be waterborne, solventborne, or a combination thereof. In waterborne embodiments, one of the discrete inclusions and the continuous matrix may be derived from an aqueous dispersion of a linear crosslinkable polyurethane containing charged groups, and the other of the discrete inclusions and the continuous matrix may be derived from a crosslinking agent containing charged groups.

In certain embodiments, the continuous matrix is hygroscopic or further includes a hygroscopic material. In these or other embodiments, the discrete inclusions are hygroscopic or further include a hygroscopic material.

The oil-smudge-resistant material, during use, will typically contain captured oil in the oleophilic material (i.e. in either the discrete inclusions or the continuous matrix). Captured oil means that oil is physically absorbed in or adsorbed on the oleophilic material. Capture oil is typically not reacted chemically with the oleophilic material, although chemical bonding is possible.

In some variations of the invention, the oil-smudge-resistant material forms a coating disposed on a substrate. The coating may have a thickness from about 1 μm to about 10 mm, for example. In various embodiments, the coating thickness is about 100 nm, 1 μm, 10 μm, 100 μm, 1 mm, or 10 mm. Thicker coatings provide the benefit that even after surface abrasion, the coating still functions for smudge resistance because the entire depth of the coating (not just the outer surface) contains the oleophilic and oleophobic regions. The coating substrate composition and thickness will depend on the specific application.

Various embodiments and strategies are depicted in the drawings of FIGS. 1A, 1B, 2A, and 2B, which should not be construed to limit the invention. These drawings are for illustration purposes and are not to scale. The drawings of FIGS. 1A, 1B, 2A, and 2B are two-dimensional cross-sections, as a side view. The top of each structure represents the surface that is exposed to the environment.

In FIG. 1A, the structure 100 includes an oleophobic matrix 110 and a plurality of oleophilic inclusions 120 dispersed throughout the oleophobic matrix 110. The oleophilic inclusions 120 may be dispersed uniformly (e.g., ordered) or non-uniformly (e.g., randomly). The oleophobic matrix 110 and/or the oleophilic inclusions 120 are optionally transparent. An oil particle 150 is depicted as depositing on the surface to generate an absorbed oil particle 151. The absorbed oil particle 151 then diffuses through the oleophobic matrix 110 until the oil particle 151 contacts an oleophilic inclusion 120, dissolving into it to generate a captured oil particle 152. The captured oil particle 152 remains in the oleophilic inclusion 120, because there is no thermodynamic tendency for the captured oil particle 152 to penetrate back into the oleophobic matrix 110. The detailed mass-transport processes are not shown in FIG. 1A, and the invention shall not be limited by speculation of mechanisms involved. Typically, there will be many oil particles 150 that contaminate the surface; only one oil particle is shown for convenience. The oleophilic inclusions 120 can all function as oil reservoirs for multiple oil particles that traverse through the oleophobic matrix 110.

Figure 1B:
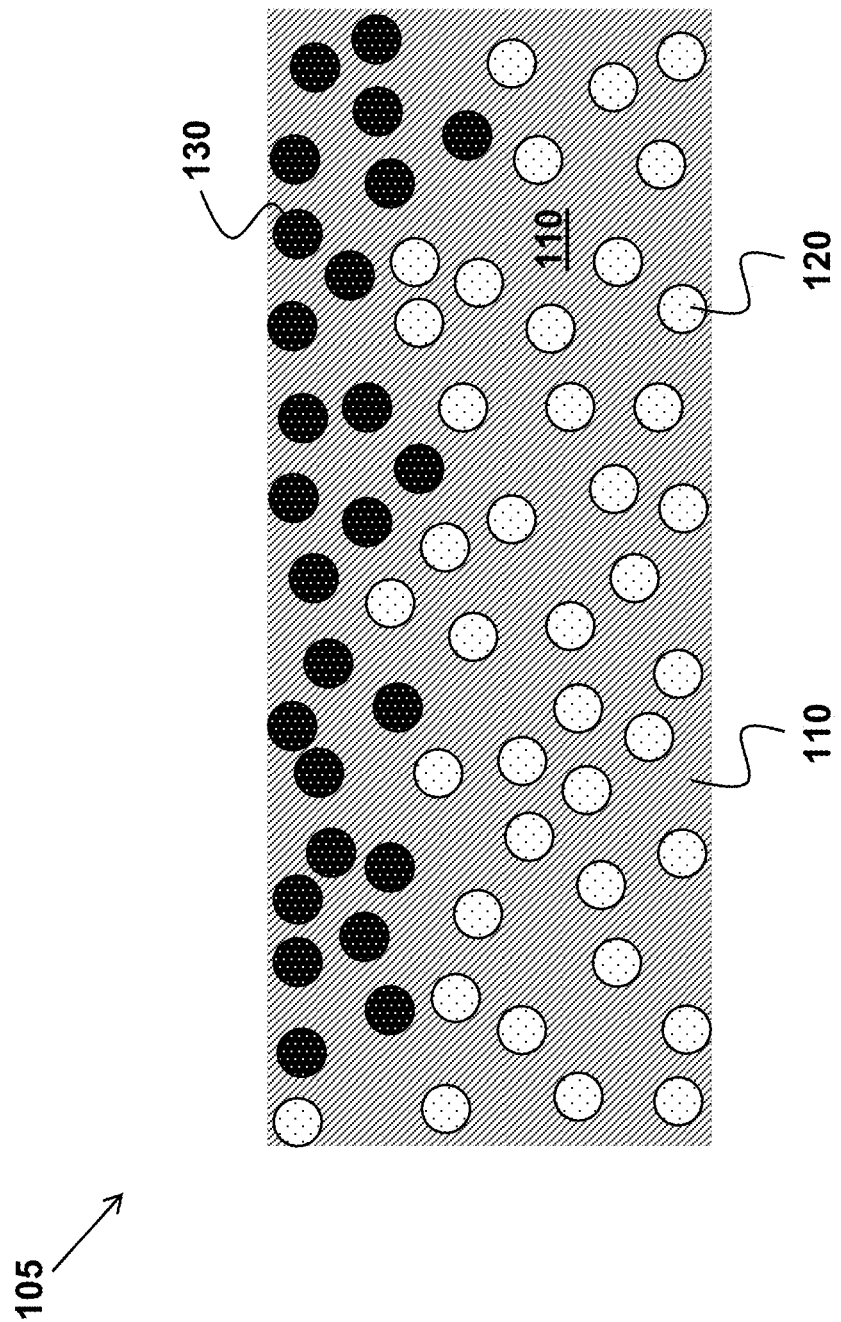
FIG. 1B depicts the exemplary oil-smudge-resistant material of FIG. 1A, following some amount of oil capture.

Following some amount of oil capture, the structure 100 transitions to the structure 105 shown in FIG. 1B. Due to the presence of captured oil particles 152, at least some of the oleophilic inclusions 120 become oil-containing oleophilic inclusions 130 (oil reservoirs) within the oleophobic matrix 110. FIG. 1B implies that most of the oleophilic inclusions 120 near the surface have captured oil to therefore become oil-containing oleophilic inclusions 130, while the oleophilic inclusions 120 in the distal region from the surface (e.g., closer to a substrate material) of the oleophobic matrix 110 have not captured a significant amount of oil. This could be due to the fact that the total amount of oil that has been deposited is below the maximum capacity (for capturing oil) of the plurality of oleophilic inclusions 120 that are present, or because FIG. 1B is a snapshot in time, for example. FIG. 1B does not depict additional incoming oil particles, but it should be understood that more oil particles may continue to contaminate the surface of structure 105.

Figure 2B:
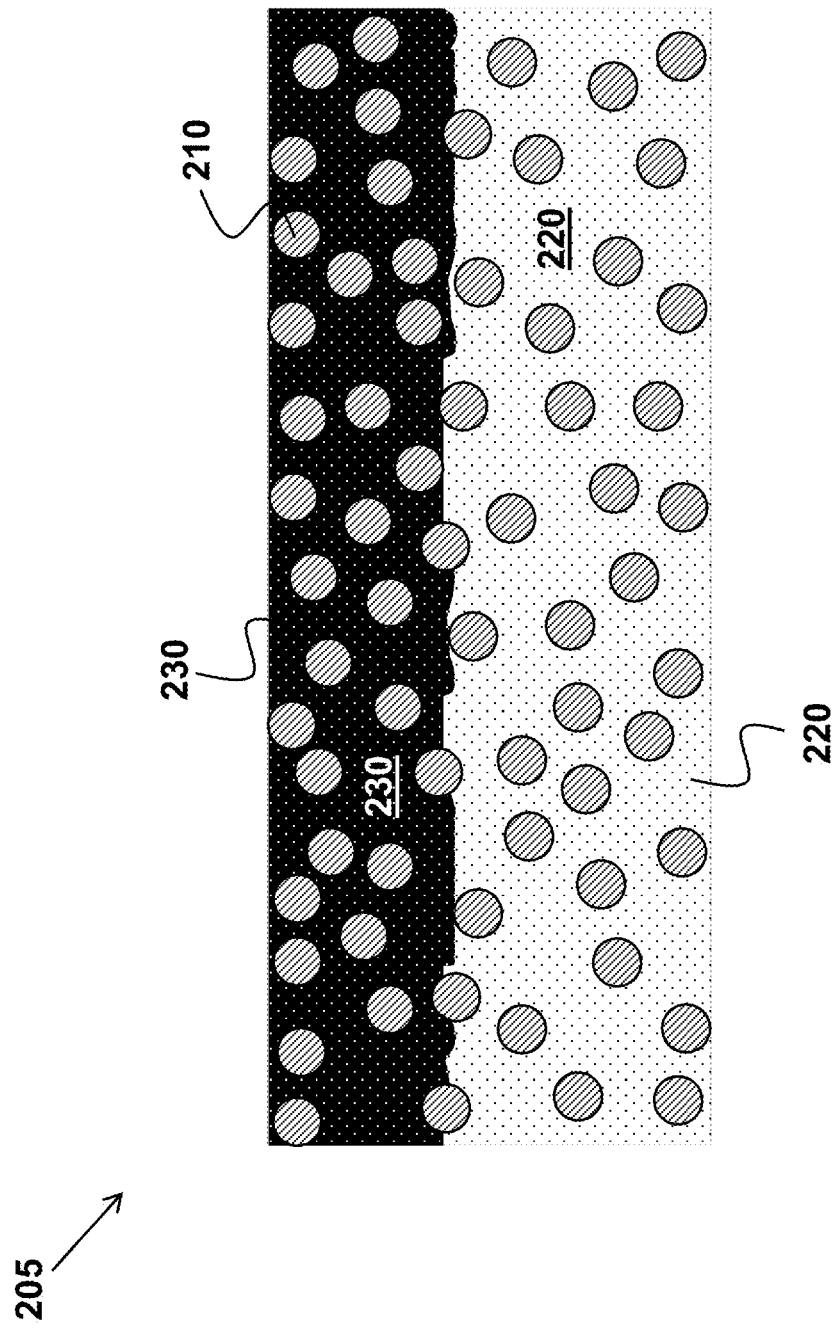
FIG. 2B depicts the exemplary oil-smudge-resistant material of FIG. 2A, following some amount of oil capture.

Some variations of the invention are depicted in FIGS. 2A and 2B, which present alternative configurations compared to FIGS. 1A and 1B. In particular, in FIGS. 2A/2B, the inclusions are oleophobic while the matrix is oleophilic—the reverse of FIGS. 1A/1B.

In FIG. 2A, the structure 200 includes an oleophilic matrix 220 and a plurality of oleophobic inclusions 210 dispersed throughout the oleophilic matrix 220. The oleophobic inclusions 210 may be dispersed uniformly (e.g., ordered) or non-uniformly (e.g., randomly). The oleophilic matrix 220 and/or the oleophobic inclusions 210 are optionally transparent. An oil particle 250 is depicted as depositing on the surface to generate an absorbed oil particle 251. The absorbed oil particle 251 avoids the oleophobic inclusions 210 and diffuses into the oleophilic matrix 220, dissolving into it to generate a captured oil particle 252. The captured oil particle 252 remains in the oleophilic matrix 220, because there is no thermodynamic tendency for the captured oil particle 252 to penetrate into any of the oleophobic inclusions 210. The detailed mass-transport processes are not shown in FIG. 2A, and the invention shall not be limited by speculation of mechanisms involved. Typically, there will be many oil particles 250 that contaminate the surface; only one oil particle is shown for convenience. The oleophilic matrix 220 functions as an oil reservoir for multiple oil particles.

Following some amount of oil capture, the structure 200 transitions to the structure 205 shown in FIG. 2B. Due to the presence of captured oil particles 252, at least some of the oleophilic matrix 220 becomes an oil-containing oleophilic matrix 230 (oil reservoir). FIG. 2B implies that the oleophilic matrix 220 near the surface has captured oil to therefore become oil-containing oleophilic matrix 230, while the oleophilic matrix 220 in the distal region from the surface (e.g., closer to a substrate material) has not captured a significant amount of oil. This could be due to the fact that the total amount of oil that has been deposited is below the maximum capacity (for capturing oil) of the oleophilic matrix 220, or because FIG. 2B is a snapshot in time, for example. FIG. 2B does not depict additional incoming oil particles, but it should be understood that more oil particles may continue to contaminate the surface of structure 205. Also it is noted that the transition between the oil-containing oleophilic matrix 230 and the oleophilic matrix 220 is intentionally depicted as an imperfect line. Due to the nature of the chemical and physical mechanisms involved, a straight line would not be expected, even in the absence of channeling through voids or cracks.

Besides oil particles 150 or 250, other liquid contaminants may strike the surface of structure 100/105 or 200/205, such as water, sweat, beverages, and so on. Solid contaminants such as dust, dirt, or insects may also strike the surface of structure 100/105 or 200/205. Vapor contaminants such as oil vapor, water vapor, or smoke may also strike the surface of structure 100/105 or 200/205. Depending on the oleophilicity of the impacting material, the principles of the invention may apply such that the contaminant becomes captured in the oleophilic inclusions 120 of FIG. 1A or the oleophilic matrix 220 of FIG. 2A.

Optionally, the oleophilic inclusions 120 or the oleophilic matrix 220 is, or includes, also a hydrophilic (e.g., hygroscopic) material. In such embodiments, the oleophilic inclusions 120 or the oleophilic matrix 220 can also capture water that is deposited onto the surface of the coating. This can further enhance the smudge resistance for certain coatings which may be exposed to water alone, aqueous mixtures (such as human sweat), or water/oil mixtures (such as skin oils).

An optional substrate (not shown) may be disposed on the back side of the material, at the bottom of FIGS. 1A, 1B, 2A, and 2B. A substrate will be present when the material forms a coating or a portion of a coating (e.g., one layer of a multilayer coating). Many substrates are possible. In the example of a phone touchscreen, the coating may be disposed on a glass substrate, for example. Other layers may be present, within the substrate or on the opposite (relative to the coating) side of the substrate. Such other layers may include, for example, metallic layers, conductive layers, and adhesive layers. In another embodiment, the coating is disposed on a transparent substrate layer that is intended to form a composite film which may then be disposed (reversibly) onto a touchscreen.

Various strategies to form the materials of FIG. 1A or 2A are possible, as will be appreciated by a skilled artisan.

In some embodiments, a segmented polyurethane coating includes a microphase-separated structure of fluorinated and hydrocarbon species. Segmented copolymers are typically created by combining a flexible oligomeric soft segment (molecular weight of 1,000-5,000 g/mol, for example) terminated with an alcohol or amine reactive groups and a multifunctional isocyanate. When the isocyanate is provided in excess relative to the alcohol/amine reactive groups, a viscous prepolymer mixture with a known chain length distribution is formed. This can then be cured to a high-molecular-weight network through the addition of amine or alcohol reactive groups to bring the ratio of isocyanate to amine/alcohol groups to unity. The product of this reaction is a chain backbone with alternating segments: soft segments of flexible oligomers and hard segments of the reaction product of low-molecular-weight isocyanates and alcohol/amines.

Due to the chemical immiscibility of these two phases, the material typically phase-separates on the length scale of these individual blocks, thereby creating a microstructure of flexible regions adjacent to rigid segments strongly associated through hydrogen bonding of the urethane/urea moieties. This combination of flexible and associated elements typically produces a physically crosslinked elastomeric material.

It is also possible to incorporate two or more soft-segment oligomer blocks into a segmented polyurethane system, wherein the separate oligomer block tends to microphase-separate. This can result in more complex microstructures. Depending on relative composition of the two soft segments, discrete or continuous phases may result. Such morphologies allow for the combination of an oleophobic component to repel oil, with an oil-miscible soft segment to help dissolve or absorb oil. Preferred oleophobic soft segments are based on the perfluoropolyether structure. Preferred oil-absorbing elements are made from hydrocarbons, preferably polyolefins such as polybutadiene.

In these or other embodiments, a fluorinated continuous matrix is coupled with hydrocarbon-coated inorganic nanoparticles dispersed within the matrix. A segmented copolymer may be synthesized, with the addition of only one highly fluorinated soft-segment oligomer. Combining the functionalized oligomer with isocyanate and alcohol curatives creates a microphase-separated matrix, wherein the fluorinated oligomer forms a continuous network.

To achieve the antithetical combination of oleophobic and oleophilic materials, functionalized nanoparticles (e.g., silica nanoparticles) may be added to the reaction mixture prior to curing. Other nanoparticles include, but are not limited to, alumina, titanium dioxide, and iron oxide. The nanoparticles are preferably formulated to be oleophilic in nature, contrasting the oleophobic fluorinated (or other) matrix. The nanoparticles may be made oleophilic by reacting with hydrocarbons at the surface of the nanoparticles, for example. The hydrocarbon-rich nanoparticles disperse into discrete domains throughout a sea of oleophobic material (e.g., fluorinated copolymer), providing oil-absorbing and oil-repelling properties on the desired length scale, while optionally maintaining transparency. A preferred example includes a siloxane-based perfluoropolyether and silica nanoparticles decorated with octadecyl chains.

In these or other embodiments, fluorinated polyurethane oligomers are terminated with silane groups and mixed with hydrocarbon-silane precursors to condense discrete oleophobic regions. The end groups on the oligomers (in the prepolymer) may be modified from isocyanate to silyl ethers. This can be accomplished through reaction of an isocyanate-reactive silane species (e.g., aminopropyltriethoxysilane) to provide hydrolysable groups well-known in silicon and siloxane chemistry. Such an approach eliminates the need for addition of a stoichiometric amount of curative to form strongly associative hard segments, while replacing the curative with species that possess the ability to form a covalently crosslinked network under the influence of moisture or heat. Such chemistry has been shown to preserve beneficial aspects of urethane coatings while boosting scratch resistance.

In addition, the reactivity of the terminal silane groups allows for additional functionality in the form of complimentary silanes blended with the prepolymer mixture. The silanes are able to condense into the hydrolysable network upon curing. This strategy allows for discrete domains of distinct composition to the soft urethane prepolymer on relatively small length scales (e.g., 50 nm) that minimize diffuse scattering of visible light. A specific embodiment relevant to anti-fouling involves the combination of fluoro-containing urethane prepolymer that is endcapped by silane reactive groups with additional alkyl silanes. These alkyl silanes segregate and condense to form small islands of oil-absorbing regions within the oil-repellant matrix.

Some embodiments employ waterborne polyurethane dispersions combining oleophobic and oleophilic species. Waterborne polyurethane dispersions are desired as low volatile organic compound (VOC) alternatives to traditional coating formulations. A successful waterborne polyurethane dispersion often requires the specific components to contain ionic groups to aid in stabilizing the emulsion. Other factors contributing to the formulation of a stable dispersion include the concentration of ionic groups, concentration of water or solvent, and rate of water addition and mixing during the inversion process. An oleophobic or oleophilic isocyanate prepolymer may be dispersed in water. Subsequently, a curative component expressing the alternative property (oleophilic or oleophobic) may be dispersed in water. Upon coating, the water will evaporate, promoting the formation of a microphase-separated polyurethane film containing both oil-absorbing and oil-repelling components/properties.

Any known methods to fabricate these materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process.

The oil-smudge-resistant material, in some embodiments, is formed from a precursor material (or combination of materials) that may be provided, obtained, or fabricated from starting components. The precursor material is capable of hardening or curing in some fashion, to form a substantially continuous matrix along with a plurality of inclusions, dispersed within the matrix. The precursor material may be a liquid; a multiphase liquid; a multiphase slurry, emulsion, or suspension; a gel; or a dissolved solid (in solvent), for example.

The different components may initially be in the same phase or in different phases. In some embodiments, an oleophobic material is in liquid or dissolved form while an oleophilic material is in dissolved-solid or suspended solid form. In some embodiments, an oleophobic material is dissolved-solid or suspended-solid form while an oleophilic material is in liquid or dissolved form. In some embodiments, an oleophobic material and an oleophobic material are both in liquid form, or both in dissolved (solvent and/or water) form.

Certain preferred embodiments employ one-shot polymerization to produce an oil-smudge-resistant composition. In one-shot polymerization, the reactants are mixed together in the liquid phase in a suitable container, within a mold, or on a substrate, and allowed to react simultaneously. No prepolymer is first formed. One-shot polymerization is especially preferable when transparent coatings are desirable.

In some variations of the invention, a material or coating precursor is applied to a substrate (such as a surface of a touchscreen) and allowed to react, cure, or harden to form a final coating.

In some embodiments, a precursor material is prepared and then dispensed (deposited) over an area of interest. Any known methods to deposit precursor materials may be employed. A fluid precursor material allows for convenient dispensing using spray coating or casting techniques.

The fluid precursor material may be applied to a surface using any coating technique, such as (but not limited to) spray coating, dip coating, doctor-blade coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final oil-smudge-resistant material using any one or more of curing or other chemical reactions, or separations such as removal of solvent or carrier fluid, monomer, water, or vapor. Curing refers to toughening or hardening of a polymeric material by physical crosslinking, covalent crosslinking, and/or covalent bonding of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

Following oil capture during use of the oil-smudge-resistant coating, optionally a solvent rinse may be periodically performed to remove captured oil, thereby regenerating the coating. In some embodiments, the oil capture is intended to be permanent. In some embodiments, the oil capture is semi-permanent. For example, the oil could eventually go away by various mechanisms including vaporization, solubility into environmental conditions, and so on.

EXAMPLES

Example 1: Synthesis of Segmented Polyurethane Containing Fluoropolymer and Polybutadiene Components 4,4'-Methylenebis(cyclohexyl isocyanate) (HMDI), 1,1,1-tris(hydroxymethyl)propane (TMP), and dibutyltin dilaurate (DBTDL) are purchased from Sigma-Aldrich. 5147x PFPE-ethoxylated diol is obtained from Solvay Special Polymers. LBH-P2000 hydroxyl-terminated polybutadiene is obtained from CrayValley.

LBH-P2000 (0.1 g, 0.025 mol eq), HMDI (4.2 g, 8 mol eq), and DBTDL (2 µL, 0.02 wt %) are added to a 3-neck round-bottomed flask equipped with a Teflon mechanical stirrer and $N_2$ purge. The round-bottomed flask is heated to 90° C. and allowed to react with stirring for 1 hr. 5147x PFPE-ethoxylated diol (4.9 g, 1 mol eq) is added and the reaction proceeds another 2 h. The reaction contents are removed from the heat, allowed to cool for at least 10 min, and diluted with solvent. TMP, also diluted in solvent, is then added to the reaction. After centrifugal mixing (30 s at 2300 rpm) the solution is either sprayed or cast in a mold to form a thin film.

Example 2: Synthesis of Fluoropolymer-containing Polyurethane with Oleophilic Silica Nanoparticles 4,4'-Methylenebis(cyclohexyl isocyanate) (HMDI), 1,1,1-tris(hydroxymethyl)propane (TMP), and dibutyltin dilaurate (DBTDL) are purchased from Sigma-Aldrich. MA-ST provided colloidal silica in methanol. Octadecyltrimethoxysilane (ODTMS) and 50% trifluoropropyl polydimethylsiloxane (50% F-C21) are obtained from Gelest.

To prepare oleophilic silica nanoparticles, a procedure is adapted from U.S. Pat. No. 7,732,497, which is hereby incorporated by reference herein. MA-ST silica (25 mL) is added to a 100 mL round-bottomed flask equipped with a magnetic stir bar. ODTMS (2 mL) diluted in toluene (50 mL) is added to the MA-ST silica. A condenser is affixed to the round-bottomed flask. The reaction is heated to reflux, and allowed to stir overnight. The reaction contents are transferred to a centrifuge tube and washed through repeated solvent addition, centrifugation, and decanting. After washing, the solvent is evaporated and THF is added. An ultrasonic probe is used to disperse the oleophilic silica nanoparticles in solution.

50% F-C21 trifluoropropyl polydimethylsiloxane (7.1 g, 1 mol eq), HMDI (1.5 g, 4 mol eq), and DBTDL (approximately 8 µL, 0.1 wt %) are added to a 3-neck round-bottomed flask equipped with a Teflon mechanical stirrer and $N_2$ purge. The round-bottomed flask is heated to 90° C. and allowed to react with stirring for at least 2 hr. The reaction is removed from the heat, allowed to cool for at least 10 min, and diluted with solvent containing the oleophilic silica (1 wt %). Centrifugal mixing (30 s at 2300 rpm) aids dispersing the nanoparticles and dissolving the prepolymer. Finally, TMP diluted in solvent is added to the reaction. After centrifugal mixing (30 s at 2300 rpm), the solution is either sprayed or cast in a mold to form a thin film.

Example 3: Synthesis of Fluoropolymer-Containing Polyurethane with In Situ Oleophilic Silica Nanoparticles 4,4'-Methylenebis(cyclohexyl isocyanate) (HMDI), 1,1,1-tris(hydroxymethyl)propane (TMP), and dibutyltin dilaurate (DBTDL) are purchased from Aldrich. 5147x PFPE-ethoxylated diol is obtained from Solvay Special Polymers. Octadecyltrimethoxysilane (ODTMS) is obtained from Gelest.

50% F-C21 trifluoropropyl polydimethylsiloxane (7.1 g, 1 mol eq), HMDI (1.5 g, 4 mol eq), and DBTDL (approximately 8 µL, 0.1 wt. %) are added to a 3-neck round-bottomed flask equipped with a Teflon mechanical stirrer and $N_2$ purge. The round-bottomed flask is heated to 90° C. and allowed to react with stirring for at least 2 h. The reaction is removed from the heat, allowed to cool for at least 10 min, and diluted with ODTMS (1 wt %) in THF. The reaction is stirred to dissolve the prepolymer and incorporate the ODTMS. Finally, TMP is diluted in solvent and added to the reaction. After centrifugal mixing (30 s at 2300 rpm), the solution is either sprayed or cast in a mold to form a thin film.

The disclosed technology provides a novel route to commercial anti-smudge coatings by combining both dewetting and oil-absorbing elements. This will allow for both macroscale and microscale removal of oil and grease smudges, while optionally maintaining a transparent film. The basis of the technology also addresses the issue of scale and durability, employing chemistry and application methods compatible with commercial production processes.

The invention may be applied to touchscreens for improved consumer aesthetics and perceptions of cleanliness. The invention may be applied to screens in general, for phones, tablets, computers, vehicles, consumer appliances, control boxes, etc. Other practical applications for the present invention include, but are not limited to, vehicle windows, optical lenses, instruments, sensors, eyeglasses, and cameras.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An oil-smudge-resistant material comprising a plurality of discrete inclusions dispersed within a continuous matrix, wherein one of said discrete inclusions and said continuous matrix is an oleophobic material, and the other of said discrete inclusions and said continuous matrix is an oleophilic material; wherein said oil-smudge-resistant material is a waterborne material; and wherein one of said discrete inclusions and said continuous matrix is derived from an aqueous dispersion of a linear crosslinkable polyurethane, and the other of said discrete inclusions and said continuous matrix is derived from a crosslinking agent.

2. The oil-smudge-resistant material of claim 1, wherein said discrete inclusions are oleophilic and said continuous matrix is oleophobic.

3. The oil-smudge-resistant material of claim 1, wherein said continuous matrix is oleophilic and said discrete inclusions are oleophobic.

4. The oil-smudge-resistant material of claim 1, wherein said discrete inclusions and said continuous matrix are phase-separated regions of a copolymer.

5. The oil-smudge-resistant material of claim 4, wherein said copolymer is a segmented copolymer.

6. The oil-smudge-resistant material of claim 5, wherein said segmented copolymer includes:
  (a) one or more first soft segments selected from fluoropolymers having an average molecular weight from about 500 g/mol to about 20,000 g/mol, wherein said fluoropolymers are ($\alpha,\omega$)-hydroxyl-terminated and/or ($\alpha,\omega$)-amine-terminated;
  (b) one or more second soft segments selected from saturated or unsaturated polymeric hydrocarbons that are ($\alpha,\omega$)-hydroxyl-terminated and/or ($\alpha,\omega$)-amine-terminated;
  (c) one or more isocyanate species, or a reacted form thereof, possessing an isocyanate functionality of 2 or greater; and
  (d) one or more polyol or polyamine chain extenders or crosslinkers, or a reacted form thereof.

7. The oil-smudge-resistant material of claim 1, wherein said discrete inclusions are present in a concentration from about 1 wt % to about 99 wt % based on total weight of said oil-smudge-resistant material.

8. The oil-smudge-resistant material of claim 1, wherein said continuous matrix is present in a concentration from about 1 wt % to about 99 wt % based on total weight of said oil-smudge-resistant material.

9. The oil-smudge-resistant material of claim 1, wherein said discrete inclusions have an average size from about 1 nanometer to about 150 microns.

10. The oil-smudge-resistant material of claim 1, wherein said discrete inclusions have an average center-to-center spacing between adjacent inclusions, through said continuous matrix, from about 5 nanometers to about 150 microns.

11. The oil-smudge-resistant material of claim 1, wherein said oil-smudge-resistant material is transparent.

12. The oil-smudge-resistant material of claim 1, wherein said oleophilic material is a polymer.

13. The oil-smudge-resistant material of claim 12, wherein said polymer is a polyolefin selected from the group consisting of polyethylene, polypropylene, polybutene, polybutadiene, polymethylpentene, polyisobutylene, polyisoprene, and combinations thereof.

14. The oil-smudge-resistant material of claim 1, wherein said oleophilic material is an inorganic material that is surface-modified to contain a hydrocarbon surface species.

15. The oil-smudge-resistant material of claim 14, wherein said hydrocarbon surface species is selected from the group consisting of saturated or unsaturated $C_6$-$C_{20}$ hydrocarbon groups.

16. The oil-smudge-resistant material of claim 1, wherein said oleophilic material is an inorganic material derived from a hydrolysable silane selected from the group consisting of octyltrimethoxysilane, octyltriethoxysilane, decyltrimethyoxysilane, decyltriethyoxysilane, octadecyltrimethoxysilane, octadecyltriethoxysilane, and combinations or homologues thereof.

17. The oil-smudge-resistant material of claim 1, wherein said oleophobic material has a surface energy from about 5 $mJ/m^2$ to about 50 $mJ/m^2$.

18. The oil-smudge-resistant material of claim 1, wherein said oleophobic material is selected from the group consisting of perfluoropolyethers, polytetrafluoroethylene, polyvinylidene fluoride, polyvinyl fluoride, perfluoroethers, fluoroacrylates, fluorosilicones, siloxanes, and combinations thereof.

19. The oil-smudge-resistant material of claim 1, wherein said linear crosslinkable polyurethane contains charged groups, and wherein said crosslinking agent contains charged groups.

20. The oil-smudge-resistant material of claim 1, wherein said continuous matrix is hygroscopic or further includes a hygroscopic material.

21. The oil-smudge-resistant material of claim 1, wherein said discrete inclusions are hygroscopic or further include a hygroscopic material.

22. The oil-smudge-resistant material of claim 1, wherein at least a portion of said oleophilic material contains captured oil.

23. The oil-smudge-resistant material of claim 1, wherein said material forms a coating disposed on a substrate, wherein said coating has a thickness from about 1 to about 10 mm.

* * * * *